United States Patent Office 2,926,162
Patented Feb. 23, 1960

2,926,162
FLAVANONE COMPOUNDS AND PREPARATION THEREOF

Benjamin F. Hart, Fort Lauderdale, Fla.

No Drawing. Application August 2, 1956
Serial No. 601,608

1 Claim. (Cl. 260—210)

This invention relates to flavanone carboxylic acid chalcones which are water soluble and acid stable and includes the preparation of such compounds.

Flavanone carboxylic acid chalcones have been found to have excellent therapeutic action in treatment of chronic kidney diseases, diseases of the eye, and rheumatoid diseases such as bursitis and osteoarthritis.

Such compounds are in general formed by the substitution of suitable carboxyl acid groups for a hydrogen of the flavanone ring. The esters of certain halogen acids may also be employed as well as acid chlorides. I have listed below such compounds as will give a satisfactory reaction to secure the desired product in goodly quantity.

HALOGEN-SUBSTITUTED ACIDS

Chloroacetic acid $CH_2ClCOOH$
Bromoacetic acid $CH_2BrCOOH$
Iodoacetic acid $CH_2ICOOH$
α-Chloropropionic acid $CH_3CHClCOOH$
B-chloropropionic acid $CH_2ClCH_2COOH$
α-Bromobutyric acid $CH_3CH_2CHBrCOOH$

ESTERS OF HALOGEN ACIDS

Ethyl chloro acetate $CH_2ClCOOC_2H_5$
Ethyl bromo acetate $CH_2BrCOOC_2H_5$
Ethyl iodo acetate $CH_2ICOOC_2H_5$

ACID HALIDES (ACYL HALIDES)

Acetyl chloride $CH_3COCl$(Br or I)
Propionyl chloride $CH_3CH_2COCl$(Br or I)
Butyryl chloride $CH_3CH_2CH_2COCl$(Br or I)
Butyryl bromide $CH_3CH_2CH_2COBr$ Any compound similar to the foregoing compounds will react according to the procedure used for the preparation of hesperidin-methylene-carboxy-chalcone using chloroacetic acid.

Therefore, any such compound could be used to couple with hesperidin, hesperitin, naringin, naringenin, and eriodictin to prepare derivatives of acid type or ester type according to the procedure used in the preparation of hesperidin-methylene-carboxy-chalcone.

Examples of such flavanone compounds which may be satisfactorily employed in such reactions are hesperidin, hesperitin, eriodictin, naringin and naringenin.

The derivatives obtained will depend upon which acid compound is coupled with a given flavanone. The procedure in each case is that used to prepare hesperidin-methylene-carboxy-chalcone which is shown in step by step reactions with the structural formulas of the reaction obtained with each step with the amount of the various reagents and in the order in which they are used:

Example (1) 18 g. $ClCH_2COOH$ } Neutralize with $Na_2CO_3$
    36 ml. $H_2O$
    (18 g.)
    $2ClCH_2COOH + Na_2CO_3$
    $\rightarrow 2ClCH_2COONa + H_2O + CO_2$ (2) 24 g. Hesperidin
    10 ml. 50% NaOH (vol.)
    (24 g.)

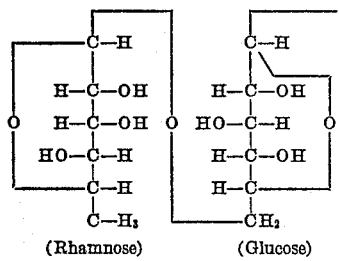

Hesperidin

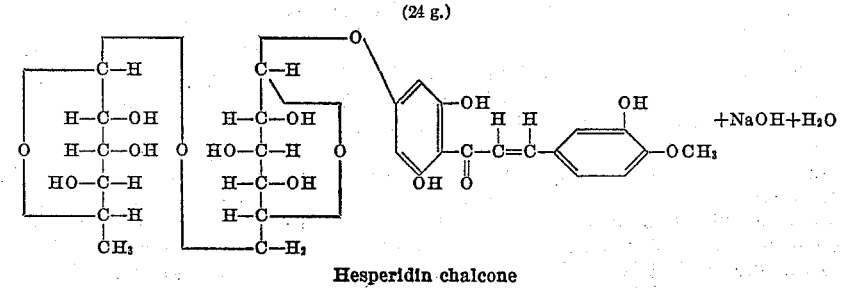

Hesperidin chalcone (3) Mix (1) and (2) above and let stand overnight at 40° C.
Slurry with stirrer

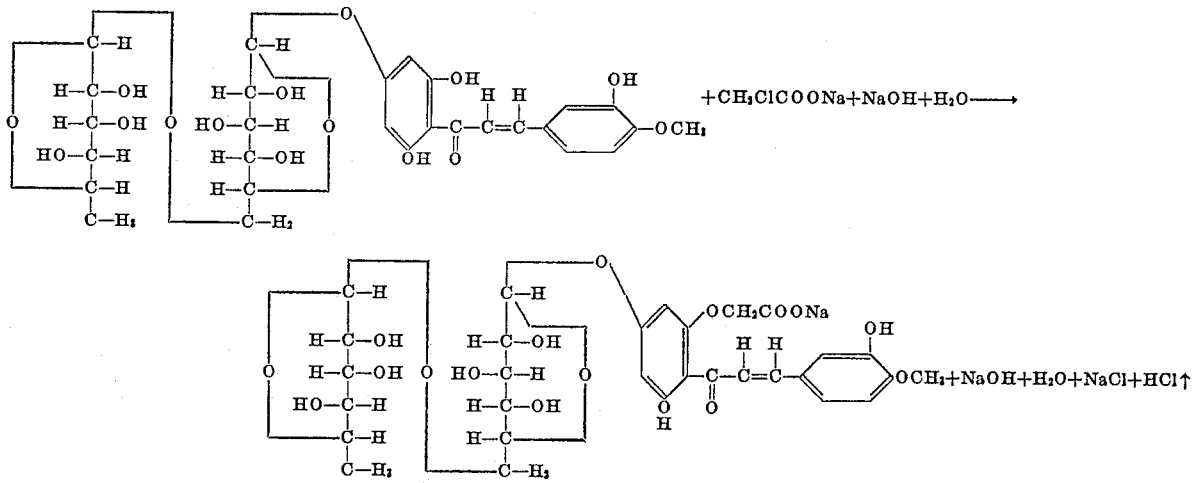

(a) Part of the HCl gas is dissolved in the water with the NaOH to form NaCl as follows:
$NaCH + HCl \rightarrow NaCl + H_2O$
(b) Part of the HCl is evolved as a gas
(c) pH of the above mixture will gradually decrease as the reaction proceeds to completion
(4) Add 200 ml. $H_2O$ to (3) above
(5) Add 45 ml. (1:5) $H_2SO_4$ to (4) above

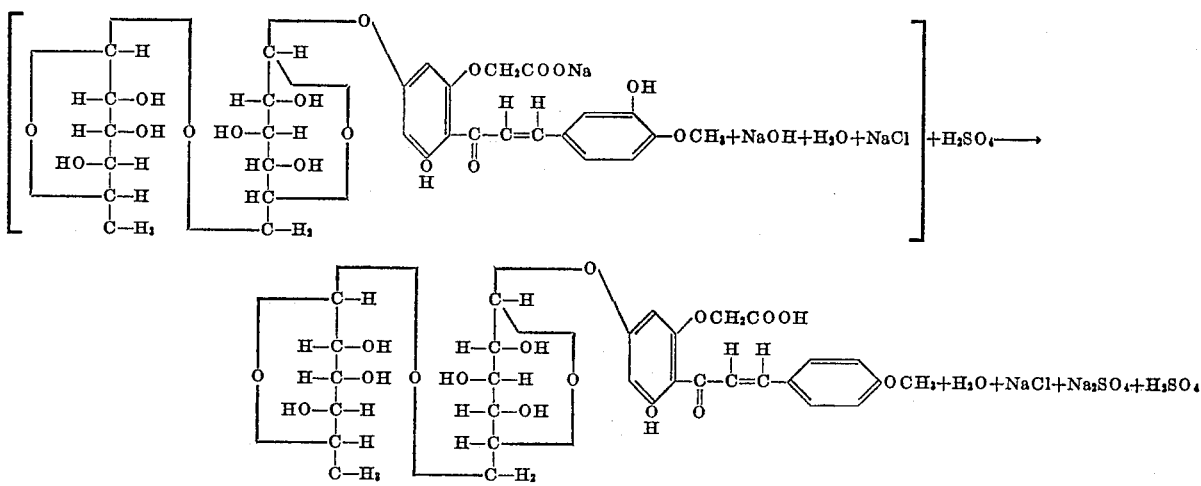

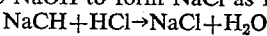
Hesperidin-methylene-carboxy-chalcone (6) Filtered to remove unreacted hesperidin
(7) 185–190 g. of $(NH_4)_2SO_4$ added to filtrate to form sirupy precipitate (Hesperidin-methylene-carboxy-chalcone)
(8) Sirupy precipitate dried in vacuum at 40° C. to give finished product Salicyclic chloride will react with hesperidin in the same manner as the chloroacetic acid as outlined above. However, the end product will be an ester of salicylic acid.

In each case after the reaction is completed the product is salted out of solution with ammonium sulfate. Usually about 8 parts of ammonium sulfate to one part of glucoside is needed to secure such a separation.

After the product is dried in a vacuum of 29 inches at a temperature of 40° C. to 45° C. it forms a brittle yellow cake which may be pulverized to a satisfactory fineness in a hammer mill or other suitable equipment.

The infra red spectral study of hesperidin-methylene-carboxy-chalcone showed two significant peaks. One is 7.87 and the other 12.3. This was compared with and differed from seven other flavanone compounds.

The ultraviolet study of hesperidin-methylene-carboxy-chalcone was done in comparison to hesperidin and hesperitin. The hesperidin methylene carboxy chalcone gave a transmittance of 47.5% at 287 mu in comparison to hesperidin which gave 32.1%. The hesperitin had 45.8% transmittance at 325 mu and the hesperidin had 81.3%. Hesperidin-methylene-carboxy-chalcone has an 80.2% transmittance at 325 mu. The melting point of the alcohol soluble portion was 175° C. to 176° C. with disintegration. The new compound was proved to be non-toxic in animal toxicity studies.

The recommended dose for adults varies from 1,000 to 2,000 mgs. per day divided into four doses. The variation of dose will largely be dependent upon the clinical entity being treated and the size of the individual. In children the dose is correspondingly smaller depending upon the weight.

The preferred method of administration is in gelatin capsules because it is hygroscopic and tends to accumulate moisture when exposed to air. It also undergoes oxidation which is indicated by darkening of color and a loss of biological activity.

It may be administered as a syrup to children. The commercial chocolate syrups designed as medicinal vehicles are satisfactory. It is of some value to add a small amount of antioxidant like tocopherol in order to retard oxidation changes when prepared as a syrup.

Obviously, other medicinal and various other uses of the new compounds will become apparent to those skilled in the art.

I claim:

Hesperidin methylene carboxy chalcone.

References Cited in the file of this patent

UNITED STATES PATENTS 2,350,804   Ohta _____ June 6, 1944

FOREIGN PATENTS 490,360   Great Britain _____ Aug. 9, 1938